E. A. SANDERS.
Plow-Clevis.
No. 204,253.    Patented May 28, 1878.
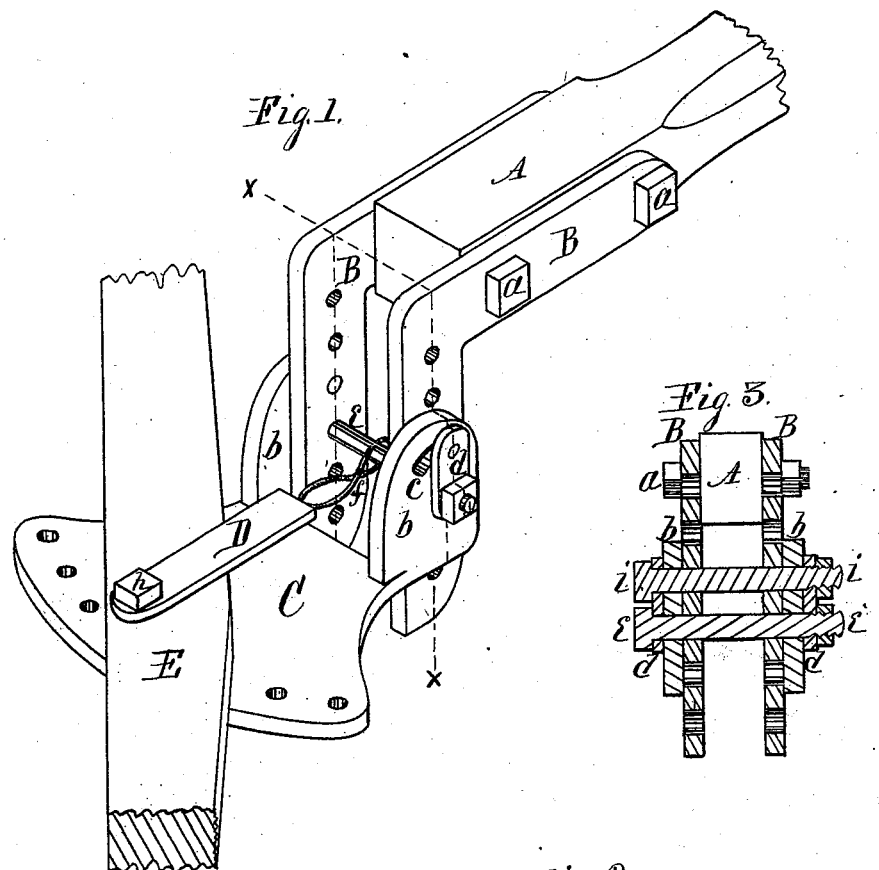
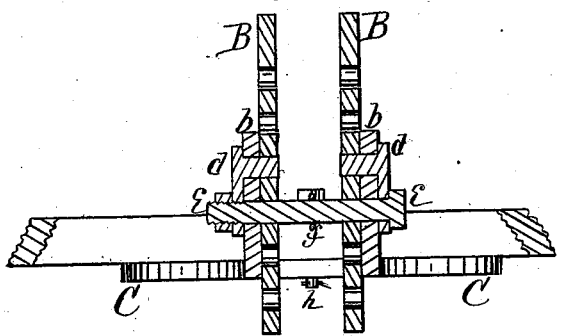
Witnesses
A. O. Behel
John Nelson
Inventor
Ebenezer A. Sanders
Per Jacob Behel
Atty

UNITED STATES PATENT OFFICE.

EBENEZER A. SANDERS, OF ROCKFORD, ILLINOIS.

IMPROVEMENT IN PLOW-CLEVISES.

Specification forming part of Letters Patent No. 204,253, dated May 28, 1878; application filed October 22, 1877.

*To all whom it may concern:*

Be it known that I, EBENEZER A. SANDERS, of the city of Rockford, in the county of Winnebago and State of Illinois, have invented a new and useful Improvement in Plow-Clevis, of which the following is a specification:

This invention relates to that class of clevis designed more especially for use on plows, and is represented in the accompanying drawings, in which—

Figure 1 is an isometrical representation of a clevis embodying my invention. Fig. 2 is a transverse vertical section on dotted line $x$, as seen from the rear; and Fig. 3 is a modification.

The object of this invention is to provide a clevis which will permit of the vertical and lateral adjustment of the evener attached to it, for the purpose of regulating the working depth of the plow, and to cause it to cut furrows of greater or less width, and, further, to prevent the evener from dropping below a horizontal plane relatively with the plow, and which will permit of a limited upward movement thereof.

In the figures, A represents the forward portion of a plow-beam of the usual form. B represents clevis-plates, formed of right-angled arms, one of which, on each plate, is provided with holes to receive suitable screw-bolts, as at $a$, which pass transversely through the plates and beam; and, by means of sufficient screw-nuts, in connection with the screw-bolts, the plates are fixed in position on the beam. The pendent arms of the clevis-plates B are provided with a series of holes to receive a clevis pin or bolt.

C represents the horizontal portion of the clevis, on which the evener is supported. Its rear end is provided with ears $b$, which project rearward and upward from the horizontal portion of the clevis, and are a proper distance apart to receive the pendent arms of the clevis-plates. These ears are provided with holes near their lower rear corners, to correspond with the holes in the pendent arms of the clevis-plates, and are provided with curved slots $c$ at their upper ends, the arc of which is formed with a radius equal to the distance between two contiguous holes in the clevis-plates. $d$ are plates fitted with inward-projecting studs near their upper ends, of sufficient length to pass through the curved slots $c$ and through the clevis-plates. The lower ends of these plates are bored to correspond with the holes in the ears $b$. These parts in place, as above described, and as represented in the drawings, a screw-bolt or clevis-pin, $e$, is then passed crosswise through the lower end of the stud-plates $d$, the ears $b$, and the pendent arms of the horizontal clevis B, and receives a screw-nut on its projecting end, to hold it in place, and holds the horizontal clevis hinged to the pendent arms of the clevis-plates in such a manner as to permit of a vertical movement of the free end of the horizontal clevis, limited by the curved slot $c$ and the stud in the upper end of the plate $d$.

The forward portion of the horizontal clevis C is of curved form, and is provided with a series of vertical holes near its forward edge.

D is a hammer-strap, connected at its rear end to the crosswise bolt $e$ by a link, $f$. Its forward end is bored to correspond with the holes in the forward edge of the horizontal clevis.

E represents an evener, placed on the horizontal clevis C under the hammer-strap D. $h$ is a clevis pin or bolt, which is passed through the hammer-strap D, the evener E, and the horizontal clevis C, and is held in place by a sufficient screw-nut or pin passed through its lower end. These parts furnish the means for the lateral adjustment of the evener, to cause the plow to cut wide or narrow furrows, which is accomplished by changing the bolt $h$, with the hammer-strap and the evener, in the proper direction, to any of the holes in the forward edge of the horizontal clevis, and, by means of the series of holes in the pendent arms of the clevis-plates B, the evener can be adjusted vertically, to cause the plow to work at a greater or less depth.

In the transverse section, at Fig. 3, I have shown a form of my improved clevis, in which I have dispensed with the studs in the plates $d$, and have employed in their stead a bolt, (represented at $i$,) which is passed through the parts, which, in connection with the curved slots $c$, serves to limit the vertical movement of the horizontal clevis and the evener connected thereto. In the use of the bolt *i*, I can also dispense with the use of the plates *d*, by substituting therefor suitable plate-washers.

I claim as my invention—

1. The combination, with clevis-plates having depending arms, each of which is provided with a single series of holes, of a horizontal clevis, constructed with upturned ears fitting the clevis-plates, said ears provided with holes for the clevis-pin, and a curved slot located above said holes, for connecting the clevis-ears to the plates by studs or a pin extending through the holes in the clevis-plates, substantially as described.

2. The combination, with the clevis-plates having a single series of holes and the horizontal clevis, provided with upturned slotted ears, of the plates *d*, having inwardly-projecting studs formed thereon, substantially as described.

3. The combination, with the clevis-plates and the horizontal clevis, provided with upturned slotted ears, of the hammer-strap attached to the clevis-pin and evener, said evener adapted to be laterally adjusted with relation to the horizontal clevis, substantially as described.

EBENEZER A. SANDERS.

Witnesses:
A. O. BEHEL,
JAMES FERGUSON.